Patented Dec. 26, 1944

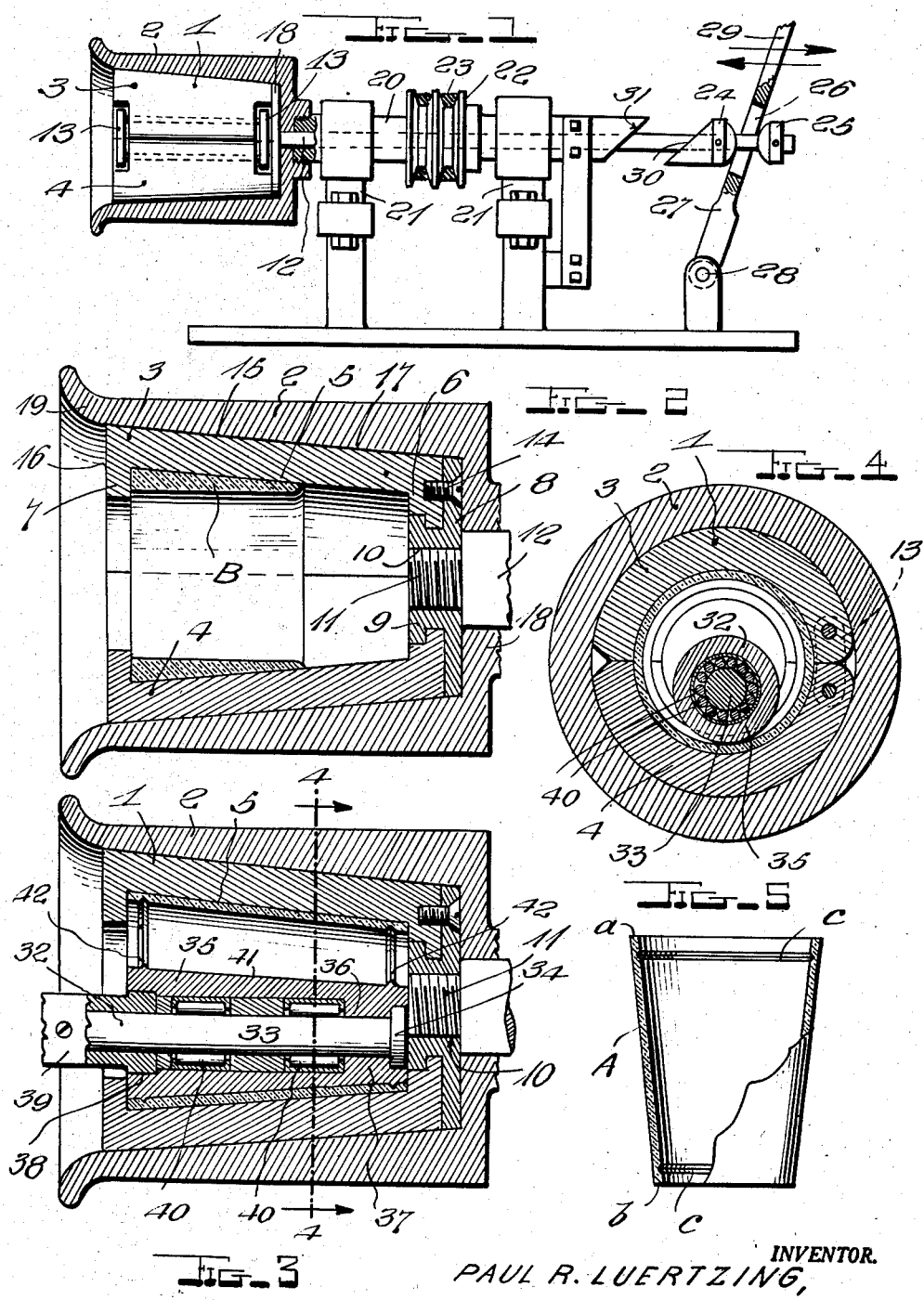

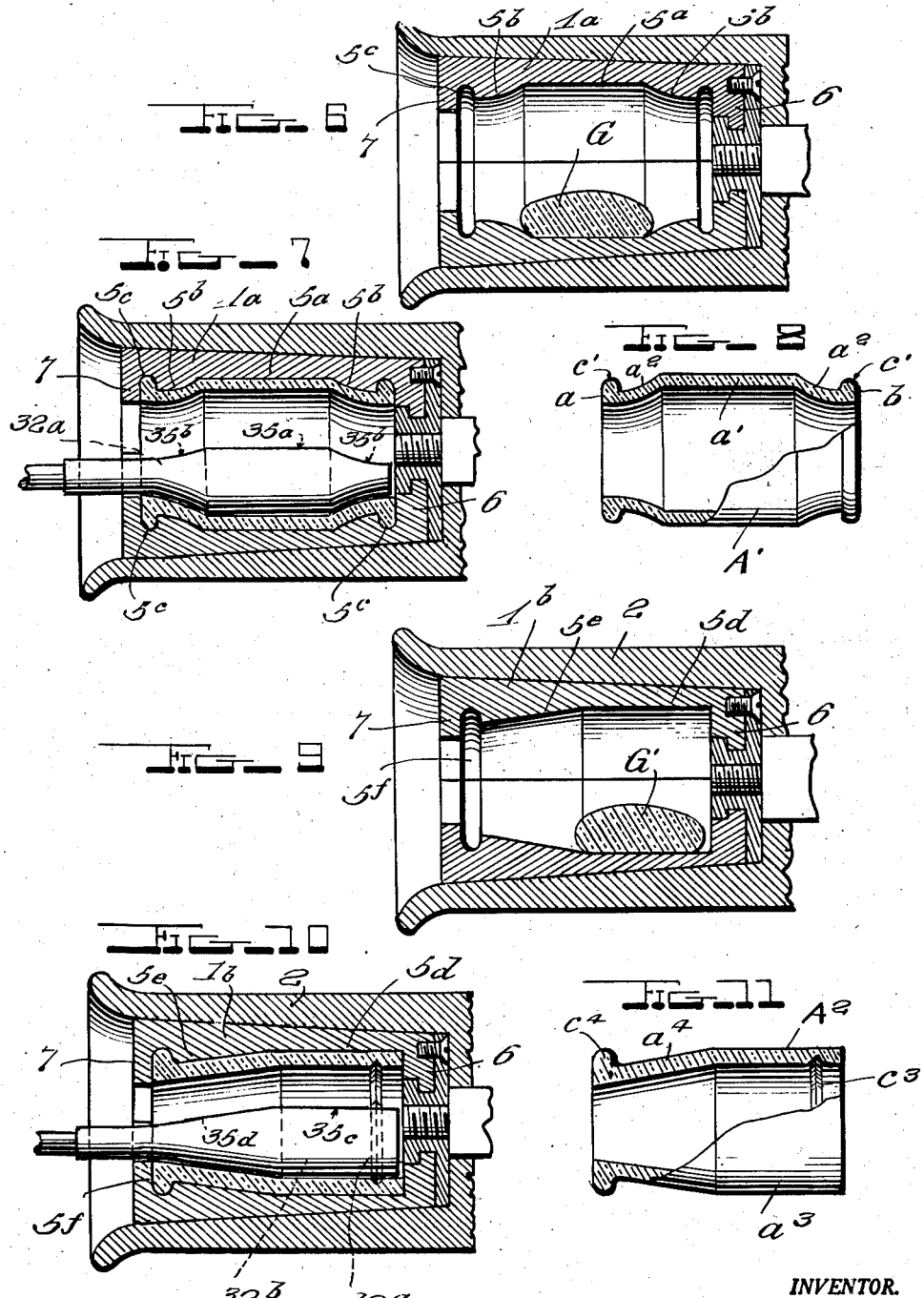

2,366,118

UNITED STATES PATENT OFFICE 2,366,118

METHOD OF AND APPARATUS FOR FORMING HOLLOW GLASS BODIES

Paul R. Luertzing, Vineland, N. J.

Application July 2, 1941, Serial No. 400,842

12 Claims. (Cl. 49—29)

This invention relates to a method of and apparatus for forming hollow glass bodies or articles of generally tubular form and open at each end, and particularly to a method of and apparatus for forming open-ended tubular articles suitable for use as container bodies or for other purposes, complete and ready for use without subsequent or auxiliary finishing operations, and in a single operation within a suitable forming mold. More particularly the invention relates to a method of and apparatus for making tubular open-ended container bodies of a desired external and internal shape and configuration and having finished ends suitably formed or constructed to have end heads or closures applied thereto and firmly secured in sealing engagement therewith.

In my applications for Letters Patents filed August 23, 1940, Serial Nos. 353,951 and 353,952, now Patent No. 2,350,052, granted May 30, 1944, I have disclosed a method of and certain forms of apparatus for manufacturing a hollow glass body by spinning a charge of glass within a mold rotated at sufficiently high speed to cause the distribution of the glass upon the forming surface of the mold by centrifugal force, the form of the mold surface and the speed of rotation of the mold being such as to produce in a single forming operation a tubular glass container body open at each end and having finished ends provided if desired with external beads or equivalent projections for the engagement therewith of heads or closures to close and hermetically seal the ends of the container.

In another application for Letters Patent, filed October 24, 1940, Serial No. 362,648, now Patent No. 2,349,046, granted May 16, 1944, I have disclosed a method of and apparatus for centrifugally manufacturing a hollow glass container body of the same character but provided in lieu of external locking beads or projections with internal grooves for the reception and sealing engagement therewith of end heads or closures. In accordance with the method and apparatus of this application the article body is first formed centrifugally in the mold and then, while the internal surface of the body is still hot, and while the mold is being rotated at a suitable speed, a rotary impression tool is introduced and operated to form the seal receiving grooves in said internal surface. As set forth in said application the impression tool disclosed therein may also be employed for otherwise shaping or impressing the internal surface of the formed body for the purpose of securing exact uniformity of diameter of said surface or to give a desired surface finish, configuration, or ornamental or other physical appearance thereto.

The method of manufacture disclosed in the aforesaid applications may be employed for the production of hollow tubular open-ended bodies or articles of any desired external form and configuration, i. e., that determined by the form and configuration of the mold surface, but such method of manufacture of a complete article centrifugally in a continuous operation is limited or restricted to the production of an article having an internal surface of cylindrical form and substantially uniform diameter throughout. This limitation or restriction is due to the fact that in a truly centrifugal forming operation which is continuous, the inner surface of the article produced will always be cylindrical and of uniform diameter as a result of the centrifugal depositing action.

The main object of the present invention is to provide a method of and apparatus for producing hollow glass articles, open at each end, which may be made of any desired external and internal form and varied internally in diameter as desired.

A further object of the invention is to provide a method and apparatus whereby articles which are externally and internally of tapered form, or partly of tapered form and partly of cylindrical form, or of any other desired external and internal shape, may be readily produced.

A still further object of the invention is to provide a method and an apparatus whereby tubular articles of desired internal and external form and of even wall thickness throughout may be produced, and whereby such articles may be shaped to the desired form in a mold and simultaneously provided with beaded or grooved end portions for the application thereto of end heads or closures adapted to be tightly secured in sealing engagement therewith.

A still further object of the invention is to provide an apparatus for forming articles of the character described embodying a centrifugal forming mold and a compression roller for cooperation therewith to enable the method of manufacture to be efficiently and expeditiously carried out.

In accordance with this invention the forming of a hollow cylindrical glass article or body, open at each end, is effected by spinning molten glass in a mold having an annular forming surface of a desired length and shape in such a manner as to cause the distribution of the glass circumferentially about a determined portion of this annular forming surface to produce an open-ended tubular blank of less length than the surface and less length but of greater general wall thickness than the finished article to be produced, in which blank forming operation the internal surface of the blank under normal conditions should be of uniform diameter or truly cylindrical or substantially so, and then inserting into the blank a properly shaped tool and causing said tool, while the blank is still in a sufficiently plastic condition, to act by rolling compression against the internal surface of the blank, to simultaneously elongate the blank in a direction lengthwise of the mold surface and expand it diametrically against the body of the mold surface so as to produce an open-ended body of a predetermined length greater than that of the blank and of a wall thickness less than that of the general wall thickness of the blank. The article so formed will then have an external shape and configuration corresponding to that of the mold surface, whatever it may be, and an internal shape and configuration corresponding to that of the shaping surface of the tool, whatever it may be. This shaping surface of the tool may be such as to impart to the interior of the article any desired internal shape, of like diameter throughout or a varying diameter, and to produce in cooperation with the mold surface an article of any desired external and internal form and configuration. At the same time the mold surface and/or the tool may be used to form the article with finished ends and internal or external surfaces for engagement by end heads or closures to adapt the latter to be firmly secured in sealing engagement with the ends of the article.

In the accompanying drawings showing for purpose of exemplification certain means for carrying the invention into practical effect—

Fig. 1 is a side elevation, with parts in section, of one type of centrifugal molding apparatus which may be employed, showing the mold drawn into the holder for a forming operation.

Fig. 2 is a central longitudinal section on an enlarged scale through the mold and its holder, the mold being of a form to produce a frusto-conical or tapered tubular article, and showing the first step of forming a blank from which the finished article is formed.

Fig. 3 is a view similar to Fig. 2 showing the application of the rolling compression tool and the article as completed in the mold.

Fig. 4 is a transverse section on the line 4—4 of Fig. 3.

Fig. 5 is a view partly in elevation and partly in section of the completed article shown in Figs. 3 and 4 removed from the mold.

Figs. 6 and 7 are views similar to Figs. 2 and 3 showing a form of mold and rolling compression tool for producing an article having a cylindrical body portion and tapered end portions.

Fig. 8 is a view similar to Fig. 5 of the article produced by the mold and compression tool shown in Figs. 6 and 7.

Figs. 9 and 10 are views similar to Figs. 2 and 3 and 6 and 7 showing another form of mold and compression tool for producing an article which is of cylindrical form at one side of its transverse center and of tapered form at the opposite side of its transverse center.

Fig. 11 is a view similar to Figs. 5 and 6 of the article produced by the mold and compression tool shown in Figs. 9 and 10.

In carrying my invention into practice I provide a centrifugal molding apparatus, which may conform to either one of the two forms disclosed in my aforesaid applications, or be of any other form and construction suitable for the purpose. The form of apparatus herein shown comprises a closable and openable article forming rotary mold 1 which is adapted to be held in closed position while in operation within a mold holder or shell 2, which is rotatable in a forming operation in unison with the mold. These elements may be mounted for use in a vertical position or in a horizontal position or in any intermediate angular position. The mold and its holder are, however, preferably disposed for use in a horizontal position, as this position obviates the necessity of raising and lowering the mold for article forming and convenient article ejecting actions, and provides for the more ready and rapid formation and ejection of the formed articles and their transfer to a lehr for annealing.

The mold 1 comprises a generally cylindrical body divided along a central longitudinal line to form two sections 3 and 4. These sections are interiorly shaped to provide an annular article body forming surface 5. Located at the ends of this surface 5, and respectively at the bottom and top or inner and outer ends of the mold, are inwardly extending flanges 6 and 7 which reduce the diameter of the mold chamber at these points. A head or plate 8 is arranged to bear against the inner end flanges 6 of the mold sections and is provided with an annularly grooved collar 9, the groove of which is formed to receive the inner edges of the flanges 6 of the mold sections. This head or plate and its collar are provided with a threaded opening 10 to receive a threaded stem or shank 11 upon the forward end of a longitudinally slidable and rotatable shaft 12, whereby the mold is adapted to be shifted longitudinally in the holder for mold closing and opening actions. The mold sections are hingedly connected at one side of the mold by hinge pins and link plate connections 13, and the flange 6 of one of the mold sections is fixedly connected, as by means of one or more fastening screws 14, to the head 8, while the other mold section is free from connection with the head, so that when the mold is projected outwardly from its holder the latter-named mold section is adapted to swing to open position.

The mold 1 is fitted in the holder 2 for rotation therewith in an article forming operation and to slide longitudinally therein for closing and opening actions. To this end the outer surface 15 of the mold is longitudinally tapered and the holder 2 is provided with a chamber 16 to conformably receive the mold, the annular body wall of which chamber has its inner surface 17 correspondingly tapered. The tapered surfaces 15 and 17 act not only as clutch surfaces to connect the mold and holder for rotation in unison, but also as variable binding surfaces to hold the mold from longitudinal movement and keep it closed in any of its seating positions in the holder and adapt the latter to act as a binder or restrainer to prevent spreading of the mold sections under centrifugal force in the rotation of the mold and holder. The chamber 16 is closed at its inner end by a head 18, but is normally open at its outer end to allow inward and outward movements of the mold and said chamber and its tapered surface are of greater length than the mold to adapt the mold to be drawn inwardly to greater or less degrees and to be fully closed by the holder and held by the tapered surfaces in any of its inwardly drawn or seating positions. At its outer end the holder is annularly enlarged or provided with a flaring or bell mouthed portion 19 adapted to accurately guide the mold into the holder and to permit the hinged mold section to swing open as soon as the inner end of the mold is forced outwardly in an article ejecting action beyond the open end of the holder, but not before. By this means the mold is adapted to be seated fully and tightly at all times in the holder regardless of the different degrees of expansion to which the mold and holder are subjected by heat in the molding operations and the mold is also adapted to be closed against any tendency of its sections to spread under centrifugal force.

The mechanism for rotating the mold and holder and sliding the mold into and out of the holder may be of any preferred construction. In the construction shown, however, the holder is mounted at its closed end on a hollow horizontal shaft 20 journaled in suitable bearing supports 21 and carrying a double pulley 22 driven by drive belts 23 from an electric or other suitable motor (not shown) capable of driving the mold and holder at a very high rate of speed. As shown, the longitudinally sliding mold shifter rod 12 extends through the hollow shaft 20 and through the head 18 and into the mold holding chamber 16 for connection with the mold in the manner described. This rod is rotatable with the mold, mold holder and shaft 20 in a molding operation and is adapted to be shifted longitudinally in one direction or the other when the mold and holder are at rest to draw the mold into the holder and close it and force it out of the holder and open it. The rear end of the rod has fixed thereto a pair of spaced abutments 24 and 25 and the portion of the rod therebetween passes through an opening 26 in an operating lever 27 pivoted at one end on one side of the rod, as at 28, and having an operating end or arm 29 extending beyond the opposite side of the rod. This lever may be moved rearwardly to transmit movement through the abutment 25 to draw the open mold from ejecting position into the holder and it may be moved forwardly to transmit movement through the abutment 24 to force the enclosed mold outwardly from the holder so that its hinged section may drop down and open the mold for the ready ejection of the formed article. When the parts are in position for a molding operation the rod 12 will rotate freely in the opening 26 and it may, if desired, be held fixed by hand or by suitable fastening means in such position during the molding period.

It is desirable to provide some means to ensure the accurate positioning of the mold for an opening and article discharge action when, at the end of an article forming operation, it is brought to a state of rest and so that its hinged section will be disposed beneath its fixed section and in position to drop downward to open the mold for the discharge or removal of the formed article. To this end a stationary rod turning member or cam 30 having an inclined cam surface is provided to engage the correspondingly inclined surface of a stationary cam member 31 provided upon one of the bearing supports 21. The cam faces of these cams or rod turning members are so arranged that when the lever 27 is moved to shift the rod forwardly for a mold opening action, the cam surfaces of the members will be brought into engagement at the moment of release of the mold from the holder so that if the mold is not disposed with its hinged section lowermost and in position to drop down the rod will be rotated to turn the mold to such position. The cams or rod turning members when so engaged will also provide a lock to hold the mold in its discharge position.

In the construction shown in Figs. 1 to 4, inclusive, the annular forming surface 5 of the mold extends continuously between the flanges 6 and 7 and is of frusto-conical form and tapers uniformly from its outer end where it intersects the flange 7 to its inner end where it intersects the flange 6. For use in connection with this mold a rotary forming tool 32 is employed to produce, in accordance with the method set forth, a container body or article of the general form for example as that shown in Fig. 5. This tool comprises an operating or manipulating rod or shaft 33 having at one end a head 34 and carrying a compression roller 35 revolubly mounted thereon. This roller is provided with a bore or chamber 36 terminating at its outer end in a portion 37 of enlarged diameter which receives the head 34, whereby such end of the chamber is closed and the roller held from longitudinal movement in one direction. At its opposite end the roller is provided with a portion 38 of enlarged diameter which receives the forward end of a retaining collar or handle sleeve 39 fixed to the rod 33, whereby the tool is adapted to be supported or gripped and whereby the roller is held from longitudinal movement in that direction. Disposed in the bore 36 about the rod and between the same and the inner surface of the roller are suitably spaced sets of anti-friction bearings 40 adapting the roller to freely revolve about the rod as an axis. The tool 32 is adapted to be inserted for use into the mold through the open outer end thereof and to be withdrawn through this mold end at the close of a forming operation and prior to the opening of the mold for the ejection of the formed article. As shown, the roller is of a length equal to that of the forming surface of the mold and is adapted to fit snugly against the flanges 6 and 7 with its ends bearing thereon so as to be held in operative position and to close the joints between the same and the flanges 6 and 7 against the escape of glass. This roller is provided with a forming surface of suitable shape to suit the work to be performed by it in cooperation with the surface 5 in an article forming operation. For the production of the form of article shown in Fig. 5 the roller is provided with a longitudinally tapered outer forming surface 41 whose taper corresponds in its degree of taper with that of the forming surface 5. This forming surface 41 may be provided with annular die ribs or other projections 42 to form grooves or make other impressions in the inner surface of the article. The article A shown in Fig. 5 is in the form of a hollow glass container body open at each end, said body being of tapering or frusto-conical form internally and externally and having a substantially uniform wall thickness from end to end thereof. This body is formed completely in the mold with finished end portions $a$ and $b$ produced by the end flanges 6 and 7 which serve as end forming surfaces, so that no further or auxiliary finishing operations are necessary. The article has its internal surfaces formed with grooves $c$, which are produced by the ribs 42 of the forming tool in the forming operation and are of suitable form to receive end heads or closures of suitable type, whereby the ends of the container may be closed when the container is packed with a commodity to hermetically seal the container.

In the operation of employing the mold and tool shown in Figs. 1 to 4, inclusive, for the production of the hollow body or article shown in Fig. 5, a charge of a suitable amount of molten glass is fed into the mold, preferably while the mold is rotating, but it may be fed into the mold when the latter is in a state of rest. The mold is then rotated at a sufficiently high rate of speed to distribute the glass by centrifugal force against a portion of the mold surface 5 so as to form an open-ended tubular blank B, as shown in Fig. 2. The glass thrown outward by centrifugal force first seeks the deepest portion or portion of greatest diameter of the mold surface and the speed of rotation of the mold and centrifugal force are therefore so regulated and calculated as to confine the deposit of glass upon the surface 5 to a chosen area of a length appreciably less than the length of said surface. This results in the operation described in the formation of a tubular blank open at each end, of a length less than the length of the mold and having a tapered outer surface conforming to the taper of that portion of the surface 5 on which it is deposited and a cylindrical inner surface of substantially uniform diameter caused by the centrifugal depositing operation. Such blank has accordingly a varying wall thickness generally greater than that of the article which is to be produced. After the blank has been formed the speed of the mold is reduced and the tool 32 introduced and the surface 41 of its roller brought to bear with a desired pressure force against the inner surface of the blank at one side of the mold. As the mold rotates the roll 35 rotates and under the rolling compression thus instituted the blank is diametrically compressed against the surfaces 5 so that it is elongated until it is spread along the full length of the surface 5 and compressed against the flanges 6 and 7. As the surfaces 5 and 41 are tapered to like degrees this spreading of the glass causes a reduction in wall thickness of the blank to a uniform wall thickness throughout the length of the blank and a change of form so that a hollow open-ended article A of regular wall thickness and tapered externally and internally to like degrees is produced. As described, with the construction of the tool 32 shown the grooves c will also be formed in the article produced for the purpose described. During the compression part of the method the mold may be rotated at any suitable speed for the work and, if desired, at sufficiently high speed to utilize the action of centrifugal force to assist the tool in spreading the glass.

In Figs. 6 and 7 I have shown a mold 1a and tool 32a having modified forms of forming surfaces for producing a specifically different shape of article, such as the article A' shown in Fig. 8 which comprises a hollow open-ended body having a cylindrical central or body portion a' and conical or tapered end portion a2 with finished ends a, b provided with external annular beads c'. For use in producing such an article I provide the mold 1a with a forming surface having a cylindrical central portion 5a and tapering end portions 5b, the latter intersecting grooves 5c located between the same and the flanges 6 and 7. The tool 32a used in conjunction with this mold is provided with coacting cylindrical and tapered forming surfaces 35a and 35b, respectively. In Fig. 6 is shown a charge of glass G supplied to the mold for the forming operation. This charge will seek the deeper central portion of the mold surface and in the preliminary step of spinning the glass will be centrifugally deposited mainly on the mold surface 5a in the form of an externally and internally cylindrical blank which in the compressing action of the tool 32a will be spread over and between the forming surfaces of the mold and tool to form the article A' of the form described and of uniform thickness. In forming this article glass will be forced into the forming grooves to produce the beads c with which suitable end heads or closures may be engaged to close and seal the ends of the article.

In Figs. 9 and 10 I have shown a mold 1b and tool 32b having other modified forms of forming surfaces for producing another form of article, such as the article A2 shown in Fig. 11. This article comprises an open-ended container body which has a cylindrical portion a3 at one end or one side of its transverse center and a conical or tapered portion a4 at its opposite end or other side of its transverse center. The end portion a3 is provided with an internal groove c3 to receive an end head or closure, while the end portion a4 is provided with an external bead c4 to receive an end head or closure. For the purpose of producing such an article the mold is provided with a forming surface having a cylindrical portion 5d, a tapered portion 5e and a forming groove 5f between the outer end of the latter and the flange 7, while the tool 32b is provided with a forming surface having a cylindrical portion 35c, a tapered portion 35d and a groove forming rib 42a. Fig. 9 shows a charge of glass G' introduced into the mold for use in forming the article. This charge will seek the deeper cylindrical portion of the mold and will be spread by the centrifugal forming step against the cylindrical mold surface to produce a correspondingly shaped blank of less length and greater general wall thickness than the article to be produced, which is completed by the compressing action of the tool 32b in a manner which will be readily understood from the foregoing description.

While the article A is shown as provided with grooves c, the article A' with beads c' and the article A2 with a groove c3 and a bead c4, it will be understood that any article produced of the forms described or other forms may be provided with either grooves or beads at either or both ends or with any other suitable internal or external portions for engagement of end heads or closures of any suitable types therewith.

While, as stated, the mold may be operated in a vertical position, a horizontal position, or any intermediate position, I preferably operate the mold in a horizontal position or in a substantially horizontal position; that is, at a slight upward angle to the horizontal, as in this position the mold may be operated with greater facility and with the advantage of producing uniformly better articles and with less liability of producing faulty articles, or of formed articles cracking in the mold, than if the mold were operated in a vertical position or at an angle approaching the vertical. A long and extensive course of experimentation has shown that this is true in spinning all cylindrical glass articles, and particularly true in spinning or spinning and rolling glass articles which are tapered externally or internally or both externally and internally or vary in diameter at points throughout their length, and where the forming cavity or chamber of the mold used is provided with a forming portion which is deeper or of greater diameter at some point than at other points in its length. Speed in forming the article from the molten glass and in discharging the article from the mold is essential in order to produce an unblemished article and to prevent cracking of the article in the mold before it can be discharged. This is due to the fact that any retardation of the flow of glass while the glass mass as a whole is in contact with a portion of the mold wall causes, by chilling and setting of the glass, a skin formation which, besides interfering with the free and unrestricted flow of the glass and the production of an article of proper wall thickness, shows as a flaw or blemish in the finished article, and also to the fact that the difference in expansion and contraction between the metallic mold and the glass is so great that it is liable to result in the cracking of the formed article if not removed at once from the mold. After the article has been formed it quickly chills and sets and, at the same time, the mold cools and begins to contract inward considerably more than the glass and consequently results in cracking the finished article unless quickly removed. It is, therefore, important to distribute the glass from the time of deposit rapidly over the forming surface for the production of the article and to discharge the article as quickly as possible from the mold. If the mold is used in a vertical position, the glass charge supplied, whether the mold is at rest or spinning, will fall in a mass to the bottom of the mold. Even if the mold is then operated at high spinning speed, the inertia of the mass of glass and the force of gravity must be overcome before the glass begins to climb and to be spread over the surfaces of the vertical mold walls, which reduces the speed of the forming operation. Contact of the glass with the bottom of the mold under these conditions causes chilling and setting of the glass to a degree which increases the resistance to the free flow of the glass and is also liable to cause the formation of a solid skin at the contact point which shows as a blemish in the formed article. The resistance to the flow of glass, furthermore, tends to prevent equal distribution and to form an article which is not of equal wall thickness. Some time is also required for the extraction of the article from the vertically disposed mold, as the mold must be opened and the article physically extracted, with liability of damage thereto, or the mold must be turned down to a horizontal position for discharge of the article, requiring a period of time in either case during which the article is liable to crack owing to the more rapid cooling of the mold. These objections are avoided by the operation of the mold in a horizontal position or substantially horizontal position, which allows the glass to be fed to the mold at some intermediate point in its length so that in the spinning operation, the glass will be spread uniformly in all directions in the length of the mold, which reduces the time period of distribution to such an extent as to avoid skin formation and restriction to the flow of glass. With the mold in a horizontal position, or substantially horizontal position, the time period for the discharge of the article is also reduced so that it may be removed before liability of cracking, due to rapid temperature changes between the mold and article occur. The operation of the mold in a horizontal, or substantially horizontal position, is particularly advantageous in forming articles of the character herein described, and wherein the mold chamber is deeper or of greater diameter at some point than at another point or points, since the introduced glass will, in the spinning of the mold, seek the deepest point and will be first spread about the mold walls at the deepest point to form the open-ended blank which is to be elongated and reduced in wall thickness and varied in wall shape by the impression tool, thus simultaneously producing the blank and establishing a starting stage for the work to be performed by the impression tool. The article when completed, may then be discharged within a minimum period of time and without liability of cracking from temperature changes by simply moving the mold out of the holder to discharging position, in which it operates to automatically discharge the article, which is facilitated by my construction and arrangement of mold.

From the foregoing description, taken in connection with the drawings, the construction of the molds and the method of manufacture constituting my invention will be readily understood without a further and extended description, and it will be seen that the invention provides a novel method of making hollow open-ended container bodies or other glass articles of different shapes and from centrifugally formed blanks which by a secondary or final step of rolling compression may be completed within the centrifugal blank forming mold to produce a hollow open-ended article of any desired external form and any desired internal form. Also it will be seen that the invention provides a method and apparatus by means of which open-ended container bodies may be rapidly produced with finished ends suitable for the application thereto of sealing closures without the necessity of any further or auxiliary finishing treatment. Furthermore, it will be understood that the mold surfaces and surfaces of the compression tools employed may be constructed and adapted to impress the articles with any desired lettering, symbols, surface ornamentation or other matter desired. The forming surfaces of the mold and tool will, of course, in practice be changed or modified to produce the articles of different forms desired, and hence the invention is not restricted to the particular forms of the forming surfaces and structural features of the parts disclosed.

What I claim is:

1. The method of making a tubular open ended glass article of a predetermined length and wall thickness and with finished end surfaces, which consists of feeding to a substantially horizontally disposed mold having suitably shaped internal forming surfaces for forming the body and ends of the article an enlongated molten glass charge of a volume equal to that of the completed article, depositing the charge on the internal article body forming surface of the mold, rapidly accelerating the rotation of the mold about a substantially horizontal axis to a high rate of speed to cause by centrifugal force alone the flow of glass along a predetermined portion of the article body forming surface to form a tubular open ended blank of uniform internal diameter and of less length than the forming surface and less length and greater wall thickness than the intended length and wall thickness of the finished article, and then internally subjecting the blank while still plastic in the mold and while the latter is rotating to outward pressure parallel with the article body forming surface to elongate it to the length of the article body forming surface and press it against the article end forming surfaces to reduce its wall thickness and thereby form a tubular open ended article of the predetermined length and wall thickness and having finished ends.

2. The method of making a tubular open ended glass article of varying internal diameter and of predetermined length and wall thickness and with finished end surfaces, which consists of feeding to a substantially horizontally disposed mold having internal forming surfaces for respectively forming the body and ends of the article, said article body forming surface including portions of varying diameter, an elongated molten glass charge of a volume equal to that of the completed article, depositing the charge on the internal article body forming surface of the mold, rapidly accelerating rotation of the mold about a substantially horizontal axis to a high rate of speed to cause by centrifugal force along the flow of glass along a portion of major diameter of the article body forming surface to form a tubular open ended blank of less length than said forming surface and less length and greater wall thickness than the intended length and wall thickness of the finished article, and then subjecting the blank while still plastic in the mold and while the latter is rotating to internal outward pressure of a tool rotating on a horizontal axis parallel with the mold axis and disposed between the article end forming surface and acting on the blank to reduce its wall thickness and elongate it to the length of the article body forming surface and press it against the article end forming surfaces and thereby form a tubular open ended article of varying diameter and of the predetermined intended length and wall thickness and having finished ends.

3. The method of making a tubular open ended glass article of varying internal diameter and of a predetermined length and wall thickness and with finished end surfaces, which consists of feeding to a substantially horizontally disposed mold having a longitudinally extending annular internal forming surface of varying diameter for respectively forming the body and ends of the article an elongated molten glass charge of a volume equal to that of the completed article, depositing the charge on the annular internal article body forming surface of the mold, rapidly accelerating rotation of the mold about a substantially horizontal axis to a high rate of speed to cause by centrifugal force alone the flow of glass along a predetermined portion of major diameter of the article body forming surface to form a tubular open ended blank of uniform internal diameter and external shape conforming to said portion of the major diameter of the forming surface and of less length than said forming surface and less length and greater wall thickness than the intended length and wall thickness of the finished article, and then subjecting the blank while still plastic in the mold and while the latter is rotating to internal outward pressure parallel with the forming surface to reduce its wall thickness and elongate it to the length of the article body forming surface and press it against the abutment surfaces and thereby form a tubular open ended article of varying internal diameter and of the predetermined intended length and wall thickness and having finished ends.

4. The method of making a tubular open ended glass article of varying internal diameter and of a predetermined length and wall thickness and with finished end surfaces, which consists of feeding to a substantially horizontally disposed mold having a tapering longitudinally extending internal forming surface and inwardly extending annular abutment surfaces at the ends thereof for respectively forming the body and ends of the article an elongated molten glass charge of a volume equal to that of the completed article, depositing the charge on a predetermined portion of major diameter of the tapered article body forming surface of the mold, rapidly accelerating rotation of the mold about a substantially horizontal axis to a high rate of speed to cause by centrifugal force alone the flow of glass along said predetermined portion of major diameter of the article body forming surface to form a tubular externally tapered open ended blank of uniform internal diameter and of less length than said article body forming surface and less length and greater wall thickness than the intended length and wall thickness of the finished article, and then subjecting the blank while still plastic in the mold and while the latter is rotating to internal outward pressure of an externally tapered tool disposed between the abutment surfaces and rotating about an axis parallel with the mold axis to elongate it to reduce its wall thickness and the length of the article body forming surface and press it against the article end forming surfaces and thereby form a tubular open ended article of the predetermined intended length and wall thickness and having finished ends.

5. The method of making a tubular open ended glass article of varying internal diameter and of a predetermined length and wall thickness and with finished ends having seal engaging surfaces, which consists in feeding to a substantially horizontally disposed mold having an internal annular article body forming surface including a portion of major diameter and having inwardly extending article end forming surfaces at the ends of the article body forming surface an elongated molten glass charge of a volume equal to that of the completed article, depositing the charge on the internal article body forming surface of the mold, rapidly accelerating rotation of the mold about a substantially horizontal axis to a high rate of speed to cause by centrifugal force alone the flow of glass along and about said portion of major diameter of its article body forming surface to form a tubular open ended blank of uniform internal diameter and of less length than the forming surface and less length and greater wall thickness than the intended length and wall thickness of the finished article, and then subjecting the blank while still plastic in the mold and while the latter is rotating to diametric outward pressure of a suitably shaped shaping and impression tool disposed between the article end forming surfaces and rotating about a horizontal axis parallel with the mold surfaces and rotating about a horizontal axis parallel with the mold axis to elongate said blank to the length of the article body forming surface and reduce its wall thickness and press it radially against said surface and longitudinally against the article end forming surfaces to form a tubular open ended article varying in internal diameter and of the predetermined length and wall thickness and having finished ends with seal engaging surfaces formed adjacent thereto.

6. The method of making an open ended tubular glass article of varying internal diameter with finished end surfaces, which consists of feeding to a substantially horizontally disposed substantially stationary mold having an internal forming surface of varying diameter an elongated molten glass charge of a volume equal to that of the completed body, depositing the charge on said mold surface, rapidly accelerating rotation of the mold about a substantially horizontal axis to a high rate of speed to cause by centrifugal force alone the flow of glass along and about a portion of major diameter of its internal forming surface to form a tubular open ended blank of uniform internal diameter and less length than the forming surface and less length and greater wall thickness than that of the finished article, and then subjecting the blank while the mold is rotating to outward diametric compression of a tool shaped peripherally to conform to the shape of the forming surface of the mold and rotating on an axis parallel with the mold axis to elongate the blank and increase its length to the length of the mold surface and to reduce its wall thickness and impart to it an external shape conforming to that of the forming surface and an internal shape conforming to that of the periphery of the tool.

7. An apparatus for making a tubular open ended glass article of a predetermined length and wall thickness and with finished end surfaces, comprising a rotary mold open at one end and having suitably shaped internal annular longitudinally and radially extending forming surfaces for respectively forming the body and ends of the article, said mold being substantially horizontally disposed to admit of the feeding thereinto through its open end of an elongated charge of molten glass and the deposit of said charge on its internal article body forming surface, means for rapidly accelerating rotation of the mold about a substantially horizontal axis to a high rate of speed to cause by centrifugal force alone the flow of glass along and about a predetermined portion of its annular longitudinally extending article body forming surface to form a tubular open ended blank of uniform internal diameter and of less length than said forming surface and less length and greater wall thickness than that of the finished article, and a rotary tool adapted to be inserted into the mold and disposed between and rotated in contact with its radially extending article end forming surfaces about an axis parallel with the mold axis for internally subjecting the blank while still plastic in the mold and while the latter is rotating to outward pressure parallel with the article body forming surface to elongate said blank to the length of the article body forming surface and reduce its wall thickness and press it against the respective forming surfaces and thereby form a tubular open ended article of the predetermined length and wall thickness and having finished ends.

8. An apparatus for making a tubular open ended glass article of a predetermined length and wall thickness and with finished end surfaces, comprising a rotary mold open at one end and having suitably shaped internal annular longitudinally and radially extending forming surfaces for respectively forming the body and ends of the article, said mold being substantially horizontally disposed to admit of the feeding thereinto through its open end of an elongated charge of molten glass and the deposit of said charge on its internal article body forming surface, means for rapidly accelerating rotation of the mold about a substantially horizontal axis to a high rate of speed to cause by centrifugal force alone the flow of glass along and about a predetermined portion of its annular longitudinally extending article body forming surface to form a tubular open ended blank of uniform internal diameter and of less length than said forming surface and less length and greater wall thickness than that of the finished article, and a tool adapted to be inserted into the mold for cooperation therewith to complete the article, said tool comprising a shaft and an impression roller mounted thereon and adapted to be disposed between and rotated in contact with its article end forming surfaces and about said shaft parallel with the mold axis for internally subjecting the blank while still plastic in the mold and while the latter is rotating to outward pressure parallel with the article body forming surface to elongate said blank to the length of the article body forming surface and reduce its wall thickness and press it against the respective forming surfaces and thereby form a tubular open ended article of the predetermined length and wall thickness and having finished ends.

9. An apparatus for making a tubular open ended glass article of varying diameter and of a predetermined length and wall thickness and with finished end surfaces, comprising a rotary mold open at one end and having a forming chamber provided with an annular longitudinally extending internal forming surface of varying diameter for forming the body of the article and annular radially extending forming surfaces for the ends of the article, said mold being substantially horizontally disposed to admit of the feeding thereinto through its open end of an elongated charge of molten glass and the deposit of said charge on its internal article body forming surface, means for rapidly accelerating rotation of the mold about a substantially horizontal axis to a high rate of speed to cause by centrifugal force alone the flow of glass along and about a predetermined portion of the article body forming surface to form a tubular open ended blank conforming externally in shape to said portion of said surface and of uniform internal diameter and of less length than that of the forming surface and less length and greater wall thickness than that of the finished article, and a tool adapted to be inserted into the mold for cooperation therewith to complete the article, said tool embodying a rotatable impression element of an external form corresponding to that of the article body forming surface and of a length adapting it to be disposed between and rotated in contact with the article end forming surfaces and about an axis parallel with the mold axis for internally subjecting the blank while still plastic in the mold and while the latter is rotating to outward pressure parallel with the article body forming surface to elongate said blank to the length of the article body forming surface and reduce its wall thickness and press it against the respective forming surfaces and thereby form a tubular open ended article of the varying diameter and predetermined length and wall thickness and having finished ends.

10. An apparatus for making a tubular open ended glass article of a predetermined length and wall thickness and with finished end surfaces, comprising a rotary mold open at one end and having internal annular longitudinally and radially extending forming surfaces for respectively forming the body and ends of the article, the article body forming surface being of varying diameter and including a cylindrical portion and a tapered portion, said mold being substantially horizontally disposed to admit of the feeding thereinto through its open end of an elongated charge of molten glass and the deposit of said charge on its internal article body forming surface, means for rapidly accelerating rotation of the mold about a substantially horizontal axis to a high rate of speed to cause by centrifugal force alone the flow of glass along and about the cylindrical portion only of the article body forming surface to form a tubular open ended blank of uniform internal diameter and of less length than said forming surface and less length and greater wall thickness than that of the finished article, and a rotary compression tool having a peripheral shaping surface conforming in length and contour to the article body forming surface of the mold and adapted to be inserted into the mold and disposed between and rotated in contact with its article end forming surfaces and about an axis parallel with the mold axis for internally subjecting the blank while still plastic in the mold and while the latter is rotating to outward pressure parallel with the article body forming surface to elongate said blank to the length of the article body forming surface and reduce its wall thickness and press it against the respective forming surfaces and thereby form a tubular open ended article of the predetermined length and wall thickness and having finished ends.

11. The structure of claim 10, wherein the article body forming surface is of varying diameter and includes a central cylindrical portion and tapering portions between the same and the article end forming surfaces.

12. The structure of claim 10, wherein the article body forming surface is longitudinally tapered from end to end thereof between the article end forming surfaces.

PAUL R. LUERTZING.